United States Patent [19]

Kawasaki

[11] 4,118,712
[45] Oct. 3, 1978

[54] DIGITAL LIGHT METER SYSTEM FOR A CAMERA

[75] Inventor: Masahiro Kawasaki, Tokyo, Japan

[73] Assignee: Asahi Kogaku Kogyo Kabushiki Kaisha, Tokyo, Japan

[21] Appl. No.: 738,264

[22] Filed: Nov. 2, 1976

[30] Foreign Application Priority Data

Nov. 4, 1975 [JP] Japan .................................. 50-132238

[51] Int. Cl.² ............................................. G03D 7/08
[52] U.S. Cl. ................................. 354/23 D; 354/60 R
[58] Field of Search .......................... 354/23 D, 60 R; 340/347 DA; 235/154

[56] References Cited

U.S. PATENT DOCUMENTS 3,995,284  11/1976  Kitaura et al. ..................... 354/23 D

OTHER PUBLICATIONS

"Current-Steering Chip Upgrades Performance of DA Converter" Electronics, Apr. 4, 1974, pp. 125-130.
"A Monolithic 10 b Digital-to-Analog Converter . . . " IEEE Journal of Solid State Circuits, vol. SC8, #6, Dec. 1973, pp. 396-403.
"Dynamic Element Matching for High-Accuracy Monolithic D/A Converters," IEEE Journal of Solid State Circuits, Dec. 1976, pp. 795-800.

Primary Examiner—Russell E. Adams
Attorney, Agent, or Firm—Sughrue, Rothwell, Mion, Zinn and Macpeak

[57] ABSTRACT

A digital light meter system for a camera includes a light measuring and computing circuit 1 whose analog output is supplied to a comparator 2 along with the output from a D/A converter 3 fed by a digital counter 5 coupled to an oscillator 6. When the comparator detects signal balance a logic circuit 4 locks the counter outputs in a latch 7, which values are supplied to a B/D converter 8 whose outputs drive an LED display 9.

The light measuring and computing circuit provides an output proportional to the logarithm of the apex value of exposure time (or aperture opening) as a function of the sensed brightness level and preset values of film sensitivity and aperture opening (or exposure time).

The D/A converter includes a constant voltage source 32-34, four parallel transistors 23, 25, 27 and 29 having common collectors, and a resistor 31 connected between the constant voltage source and the collectors. The transistors are base driven from a constant current source 18-22, their emitters have area ratios of 1:2:4:8, and their conductions are controlled by the outputs from the counter 5, whereby their combined collector potentials are proportional to the logarithm of the analog equivalent of the counter value.

4 Claims, 3 Drawing Figures

DIGITAL LIGHT METER SYSTEM FOR A CAMERA

BACKGROUND OF THE INVENTION

This invention relates to a digital exposure time or aperture opening computing and indicating circuit for a camera.

Ammeters are often used to indicate shutter speed in prior art cameras. Such instruments are sensitive to vibrations and delicate, however, and thus provide very low reliability, particularly when used in portable equipment such as cameras. For this reason, there has been a trend to digitally display camera shutter speed and the like by using light emitting diodes and indicator lamps. However, the prior art systems of this type require the use of complicated and expensive circuits for converting analog brightness signals into corresponding digital values.

SUMMARY OF THE INVENTION

Briefly, and according to the present invention, a digital light meter system for a camera includes a light measuring and computing circuit whose analog output is supplied to a comparator along with the output from a D/A converter fed by a digital counter coupled to an oscillator. When the comparator detects signal balance a logic circuit locks the counter outputs in a latch, which values are supplied to a B/D converter whose outputs drive an LED display.

The light measuring and computing circuit provides an output proportional to the logarithm of the apex value of exposure time (or aperture opening) as a function of the sensed brightness level and preset values of film sensitivity and aperture opening (or exposure time).

The D/A converter includes a constant voltage source, four parallel transistors having common collectors, and a resistor connected between the constant voltage source and the collectors. The transistors are base driven from a constant current source, their emitters have area ratios of 1:2:4:8, and their conductions are controlled by the outputs from the counter, whereby their combined collector potentials are proportional to the logarithm of the analog equivalent of the counter value.

DETAILED DESCRIPTION OF THE PREFERRED EMBODIMENT

Figure 1:
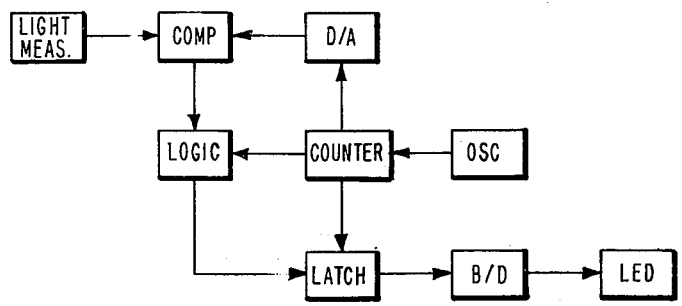
FIG. 1 shows a block diagram of a digital exposure time computing and indicating system embodying the present invention.

In the system diagram of FIG. 1, a light measuring and computing circuit measures the brightness of a photographic object and computes an analog exposure time therefrom as a function of preset aperture and film sensitivity values. An oscillator 6 is connected to a digital counter 5, adapted to count the pulses generated by the oscillator. Connected to the counter 5 are a D/A converter 3, adapted to convert the digital output from the counter into an analog signal, a logic circuit 4, and a latch circuit 7 controlled by the logic circuit 4. A comparator 2 compares the output from the light measuring and computing circuit 1 with the output from the D/A convertor 3. Connected to the latch circuit 7 is a binary-to-decimal decoder circuit 8 which drives an array of LED display elements 9.

In operation, the incrementing output of the counter 5 is converted into an equivalent analog signal by the D/A convertor 3, and this signal is continuously compared with the output from the light measuring and computing circuit 1 by the comparator 2. Simultaneously, the counter output is supplied to the latch circuit 7, and is stored therein in response to a signal from the logic circuit 4 when the comparator 2 indicates that the D/A converter output has reached the output level of the light measuring and computing circuit 1. The analog output of the circuit 1 is then digitally displayed by feeding the latch contents to the decoder circuit 8, whose output drives the LED array 9.

Figure 2:
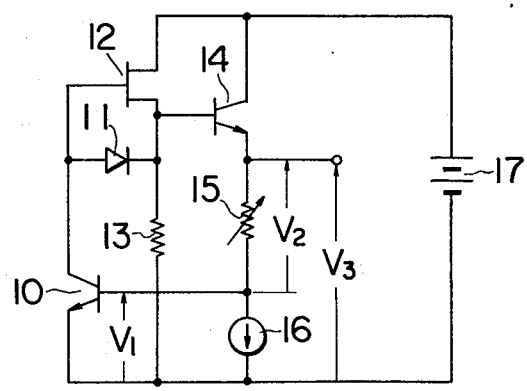
FIG. 2 shows a schematic circuit diagram of the light measuring and computing circuit of FIG. 1.

Turning now to FIG. 2, which shows a schematic diagram of the light measuring and computing circuit 1, the collector of a logarithmically compressing transistor 10 is connected to the gate of a FET 12, which forms a self biasing circuit together with a photo-diode 11 and a resistor 13. The source of FET 12 is connected to the base of a transistor 14, whose emitter is driven by a constant current source 16. An output is fed back from the emitter of transistor 14 to the base of transistor 10 through a variable resistor 15, whose resistance is set at a value proportional to the difference between the apex (Additive Photographic EXposure system) value SV of the film sensitivity and the apex value AV of the desired aperture opening, i.e. (SV-AV). The circuit is powered by a battery 17.

In operation, the voltage V1 across the base and emitter of transistor 10 will be proportional to the apex value BV of the sensed object brightness, by reason of the output from the collector of transistor 10 being fed back to the base thereof through FET 12 and transistor 14, and since the collector of transistor 10 is constant-current driven by the photo-current ip from the photo-diode 11. In mathematical terms, the voltage V1 may be expressed as follows:

$$V_1 = \frac{KT}{q} \ln \frac{i_p}{i_o} + V_{BE(i_o)}, \tag{1}$$

wherein:

K is a Holtzmann constant,
T is the absolute temperature,
q is the electron charge, and
$V_{BE(i_o)}$ is the base-emitter voltage of transistor 10 at a collector current of $i_o$.

The relationship between the sensed object brightness $B_v$ and the photocurrent $i_p$ is as follows;

$$i_p = i_{po} \times 2^{B_v}. \tag{2}$$

The photocurrent $i_{po}$ corresponds to $B_v = 0$. Substituting equation (2) in equation (1) yields:

$$V_1 = B_v \cdot \frac{KT}{q} \cdot \ln 2 + \frac{KT}{q} \ln \frac{i_{po}}{i_o} + V_{BE(i_o)} \tag{3}$$

The voltage $V_2$ across the variable resistor 15 is, assuming a resistance $R_1$ of the variable resistor 15 and a current $i_1$ through the constant current source 16:

$$V_2 = i_1 \cdot R_1. \tag{4}$$

The resistance of the variable resistor 15, which is proportional to $(S_v - A_v)$ as developed above, is:

$$R_1 = R_s[N + (S_v - A_v)], \tag{5}$$

wherein:
$R_s$ is the resistance corresponding to a one step increment of the value $(S_v - A_v)$, and
N is a constant.
If the voltage increment per step of $(S_v - A_v)$ is given by:

$$R_s \cdot i_1 + \frac{KT}{q} \ln 2, \tag{6}$$

then equation (4) above becomes:

$$V_2 = \frac{KT}{q} (\ln 2) \cdot [N + (S_v - A_v)] \tag{7}$$

Combining the equations for $V_1$ and $V_2$ above, the emitter voltage $V_3$ of transistor 14 is then given by;

$$V_3 = V_1 + V_2 = \frac{KT}{q} (\ln 2)(B_v S_v - A_v) + \tag{8}$$

$$\frac{KT}{q} \ln \frac{i_{po}}{i_o} \cdot 2^N + V_{BE(i_o)}$$

Since $(B_v + S_v - A_v)$ in equation (8) is equal to the apex value $T_v$ of the exposure time, equation (8) may be simplified to:

$$V_3 = T_v \cdot \frac{KT}{q} \ln 2 + \frac{KT}{q} \ln \frac{i_{po}}{i_o} \cdot 2^N + V_{BE(i_o)} \tag{9}$$

As may easily be seen from equation (9), the emitter voltage $V_3$ of transistor 14 is proportional to the apex value $T_v$ of the exposure time.

Figure 3:
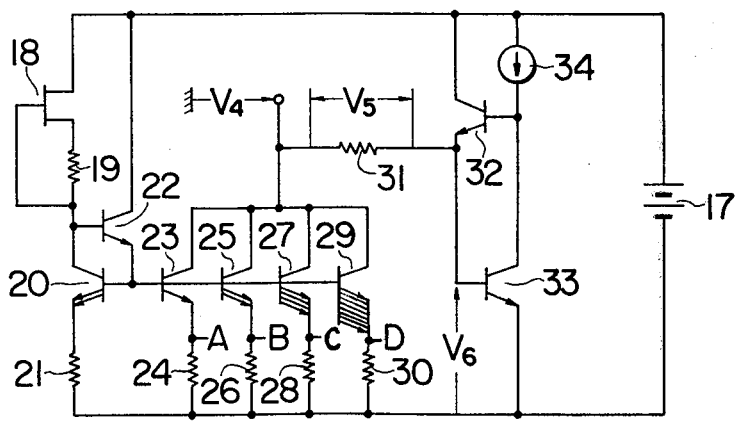
FIG. 3 shows a schematic circuit diagram of the D/A convertor of FIG. 1.

Turning now to the D/A converter shown in FIG. 3, a FET 18 is connected in a self-biasing mode through a resistor 19. The collector output of transistor 20 is fed back to its base through the base-emitter path of transistor 22. The emitter areas of transistors 20, 23, 25, 27, and 29 have a ratio of 2:1:2:4:8, and the emitters of transistors 23, 25, 27 and 29 are connected to resistors 24, 26, 28, and 30, respectively. The collector output of transistor 33, which is driven by a constant current source 34, is fed back to the base thereof through the base-emitter path of transistor 32. A resistor 31 is connected between the base of transistor 33 and the collector junction of transistors 23, 25, 27 and 29.

In operation, the source current $i_2$ of FET 18 will be as follows, assuming a voltage $V_{GS}$ across the gate and source of the FET and a resistance $R_2$ of resistor 19;

$$i_2 = V_{GS}/R_2 \tag{10}$$

If the ratio of resistors 21, 24, 26, 28, and 30 is set at 2:8:4:2:1, respectively, then the collector currents of transistors 23, 25, 27, and 29 will be $i_2/2$, $i_2$, $2i_2$, and $4i_2$. Assuming that the current established by source 34 is $i_3$, then the voltage $V_6$ across the base and emitter of transistor 33 is as follows:

$$V_6 = \frac{KT}{q} \ln \frac{i_3}{i_o} + V_{BE(i_o)} \tag{11}$$

If the emitter terminals A, B, C, and D of transistors 23, 25, 27, and 29 are connected to the outputs of the four-stage digital counter 5, and assuming a resistance $R_3$ for the resistor 31, then the voltage $V_5$ accross resistor 31 will be as shown in Table 1 for the various outputs of counter 5.

Table 1

| D | C | B | A | $V_5$ | D | C | B | A | $V_5$ |
|---|---|---|---|---|---|---|---|---|---|
| 0 | 0 | 0 | 0 | $7.5i_2R_3$ | 1 | 0 | 0 | 0 | $3.5i_2R_3$ |
| 0 | 0 | 0 | 1 | $7.0i_2R_3$ | 1 | 0 | 0 | 1 | $3.0i_2R_3$ |
| 0 | 0 | 1 | 0 | $6.5i_2R_3$ | 1 | 0 | 1 | 0 | $2.5i_2R_3$ |
| 0 | 0 | 1 | 1 | $6.0i_2R_3$ | 1 | 0 | 1 | 1 | $2.0i_2R_3$ |
| 0 | 1 | 0 | 0 | $5.5i_2R_3$ | 1 | 1 | 0 | 0 | $1.5i_2R_3$ |
| 0 | 1 | 0 | 1 | $5.0i_2R_3$ | 1 | 1 | 0 | 1 | $1.0i_2R_3$ |
| 0 | 1 | 1 | 0 | $4.5i_2R_3$ | 1 | 1 | 1 | 0 | $0.5i_2R_3$ |
| 0 | 1 | 1 | 1 | $4.0i_2R_3$ | 1 | 1 | 1 | 1 | 0 |

If, referring to Table 1, DCBA = 0001 corresponds to an apex exposure value $T_v'$ of − 3 (8 sec.), and DCBA = 1110 corresponds to an apex exposure value $T_v'$ of + 10(1/1000 sec.), then the collector potential $V_4$ of transistors 23, 25, 27, and 29 may be expressed as:

$$V_4 = V_6 - 0.5 \times (11 - T_v')i_2R_2, \tag{12}$$

where:

$$0.5 \times i_2 \times R_2 = \frac{KT}{q} \ln 2 \tag{13}$$

Substituting equations (11) and (13) in equation (12) then gives:

$$V_4 = T_v' \frac{KT}{q} \ln 2 + \frac{KT}{q} \ln \left( \frac{i_3}{i_o} \cdot \frac{1}{2^{11}} \right) + V_{BE(i_o)} \tag{14}$$

The contents of counter 5 are latched, decoded, and displayed in the system of FIG. 1, when the combined collector potentials of of transistors 23, 25, 27, and 29 reach the emitter voltage $V_3$ of transistor 14 (FIG. 2), and at such time, by definition:

$$V_3 = V_4 \tag{15}$$

Substituting equations (9) and (14) in equation (15) yields:

$$T_v \ln 2 - T_v' \ln 2 = \ln \left( \frac{i_{po}}{i_o} \cdot 2^N \right) - \ln \left( \frac{i_3}{i_o} \cdot \frac{1}{2^{11}} \right) \tag{16}$$

Now, if N and $i_3$ are set so to satisfy the following equation, $$\frac{i_{po}}{i_3} 2^{(N-11)} = 1, \tag{17}$$

then equation (16) reduces to:

$$T_v = T_v' \tag{180}$$

The foregoing mathematical derivations clearly demonstrate that the output voltage $V_3$ from the light measuring and computing circuit 1 coincides with the output voltage $V_4$ from the D/A convertor 3 over the entire range of the apex exposure time value $T_v$. In addition, since the outputs of the light measuring and computing circuit, constant voltage source and constant current source 18–22, all exhibit the same temperature dependency, the equation $V_3 = V_4 = V_6 - V_5$ will be true at all temperatures and, thus, the output of the exposure value indication system according to the present invention will be substantially temperature independent.

As will be readily apparent to those skilled in the art, the teachings of this invention are equally applicable to the measurement, computation, and digital display of the apex value $A_v$ of the aperture opening, if variable resistor 15 is set to represent the difference between the apex values of the film sensitivity and a desired exposure time $(S_v - T_v)$.

What is claimed is:

1. In a digital light meter system for a camera including an oscillator, a counter for registering the pulses produced by said oscillator, a D/A convertor for converting the digital values registered in said counter into an analog value, and a comparator for comparing the output of said D/A convertor with an output from a light measuring and computing circuit, which latter output has a temperature coefficient K and is proportional to the sensed brightness of an object as a function of preset values of film sensitivity and either aperture opening or exposure time, the improvements characterized by said D/A convertor comprising:
    (a) a constant voltage source providing a voltage having said temperature coefficient K,
    (b) first, second, third, and fourth constant current sources connected in parallel, having a common output terminal, and providing output currents having ratios of 1:2:4:8, respectively,
    (c) a fifth constant current source drivingly coupled to said first, second, third and fourth constant current sources and supplying a current I having said temperature coefficient K, said fifth constant current source comprising a self-biased field effect transistor, a first transistor having its base coupled to the gate of said field effect transistor and a second transistor having its base and collector coupled to the emitter and base, respectively, of said first transistor,
    (d) a resistor connected between the constant voltage source and said common output terminal, and
    (e) means individually connecting outputs of said counter to said first, second, third and fourth constant current sources for controlling the conductions thereof, whereby the voltage drop across said resistor is proportional to the analog equivalent of the digital value registered by said counter.

2. A digital light meter system as defined in claim 1, wherein said constant voltage source includes a sixth constant current source, a third transistor having its collector connected to said sixth constant current source, and a fourth transistor having its base and emitter connected to the collector and base, respectively, of the third transistor.

3. A digital light meter system as defined in claim 2, wherein said first, second, third and fourth constant current sources comprise four transistors connected in an emitter follower mode, the emitter areas of said four transistors have ratios of 1:2:4:8, and further comprising four resistors individually connected to the emitters of said four transistors, said resistors having resistance ratios of 8:4:2:1.

4. A digital light meter system as defined in claim 3, wherein said fifth constant current source is connected to the base of each of said four transistors.

* * * * *